United States Patent [19]

Boutros

[11] Patent Number: 4,680,013
[45] Date of Patent: Jul. 14, 1987

[54] SHIPBOARD TRANSPORTATION SIMULATOR AND BREAKBULK CARGO TABLE THEREFOR

[76] Inventor: Mansour Z. Boutros, R.R. 1, Box 121, Thomson, Ill. 61285

[21] Appl. No.: 441,843

[22] Filed: Nov. 15, 1982

[51] Int. Cl.$^4$ .............................................. G09B 9/06
[52] U.S. Cl. ..................................... 434/29; 73/865.3
[58] Field of Search ................ 434/29, 51; 73/432 SD, 73/432 K

[56] References Cited

U.S. PATENT DOCUMENTS

| 3,561,137 | 2/1971 | Guyon et al. | 434/29 |
| 3,871,113 | 3/1975 | Crago et al. | 434/29 |
| 3,984,924 | 10/1976 | Myles et al. | 434/29 |

FOREIGN PATENT DOCUMENTS 516930  7/1977  U.S.S.R. ..................... 73/432 SD

Primary Examiner—William H. Grieb
Attorney, Agent, or Firm—Anthony T. Lane; Harold H. Card, Jr.; Edward F. Costigan

[57] ABSTRACT

A shipboard transportation simulator moves a cargo container in an ocean wave-like simulation. A frame is supported for movement about a real axis, and supports the cargo container with its center of gravity above the axis. Counterweights suspend from the frame locate the combined center of gravity of the frame and container substantially at the axis. The frame and container are driven about the axis, whereby the container may be tested by reverse pendulum harmonic motion. A breakbulk table may be substituted for the container, to test breakbulk restraint systems.

13 Claims, 5 Drawing Figures

SHIPBOARD TRANSPORTATION SIMULATOR AND BREAKBULK CARGO TABLE THEREFOR

GOVERNMENT RIGHTS

The invention described herein may be manufactured and/or used by or for the government for governmental purposes without the payment of any royalty therein.

BACKGROUND OF THE INVENTION

The invention relates to a motion simulating device for analyzing transport forces on packages, and more particularly relates to a device for simulating severe weather conditions when transporting cargo and the like by ship.

Failure of restraint systems causes cargo within their containers to break loose from a fixed position. This is extremely dangerous where the cargo is ammunition. Restraining systems utilized to fix the cargo may consist of wooden braces, straps, latching devices, and similar restraints. Therefore, it would be highly desirable to have a transportation simulator which would permit analysis of the stresses that are generated in such restraint systems in order to assure that damage or loss does not occur by failure of the system.

Timber continues to be the primary material utilized for blocking and bracing bulk cargo, such as military munitions. Wood has substantial strength, is easily obtainable, needs minimum maintenance, and is relatively inexpensive. However, wood braces become loose, deteriorate, and make a weak link in the restraint system.

Ammunition cargo containers are rather large: of size approximately 8'×8'×20' having a maximum weight of 44,800 pounds. Heretofore, the procedure to test such ammunition cargo containers and their restraint systems utilized three boom cranes to swing the container to simulate shipboard transport. One crane (e.g., forty-ton capacity) carries one end of the container and the other two cranes (e.g., twenty-ton capacity each) carry the other end. The three cranes tilt the container about on its sides to test the restraint system.

This prior art test procedure is quite expensive when used in continous testing over long periods of time. Further, the testing does not actually simulate the condition of a ship roll movement. The three cranes with their operators, as well as a rigging crew have to be available for the long test period.

Therefore, it is an object of the present invention to provide a shipboard transportation simulator to evaluate transportation of cargo aboard ocean vessels.

It is a further object of the present invention to provide a shipboard transportation simulator which simulates marine environment during severe storms.

SUMMARY OF THE INVENTION

These and other objects of the present invention are accomplished in a carriage mechanism pivotable in reverse pendulum harmonic motion to simulate the roll movement of an ocean vessel. A cargo container is secured to the carriage for receiving dynamic stresses upon the container, as well as the cargo bracing within the container, by movement of the carriage in a long-term series of oscillations. A counter-balance weight is adjustably mounted relative to the horizontal axis about which the carriage is oscillated, and a control force is applied to rock the carriage about the axis of oscillation.

BRIEF DESCRIPTION OF THE DRAWINGS

FIG. 3 is a perspective view of the pivot support assembly of the simulator of FIG. 1

DETAILED DESCRIPTION OF THE PREFERRED EMBODIMENT

Figure 1:
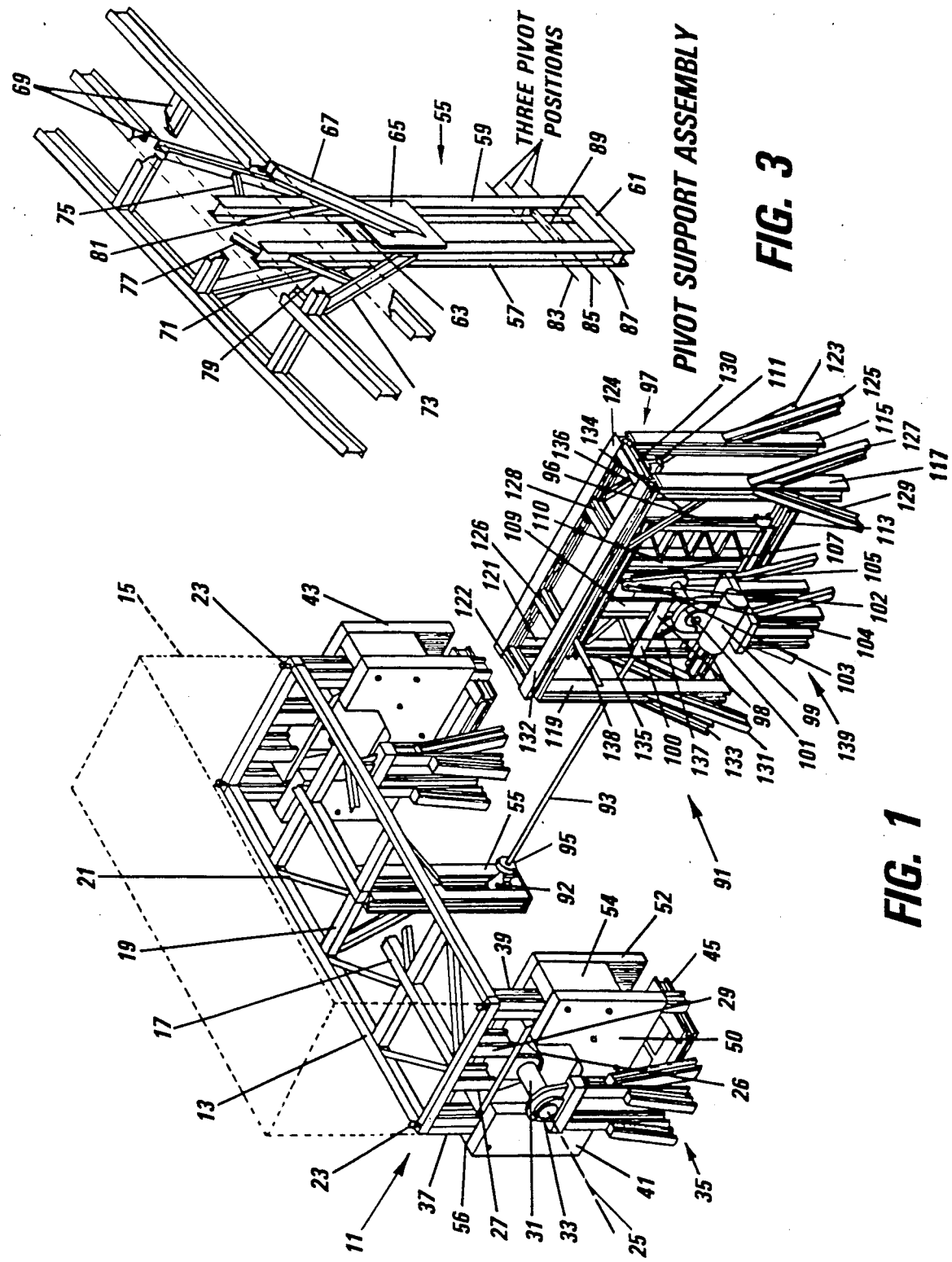
FIG. 1 is a perspective view of the transportation simulator of a preferred embodiment of the present invention.

Referring to FIG. 1, a simulator 11 includes a platform table 13 upon which a cargo container 15 (shown in phantom lines) is mounted. Table 13 may be constructed from a steel beam framework similar to that shown in FIG. 1 having a single longitudinal brace structure 17 and a plurality of lateral brace structures 19, about which encompass the four sides of the table. Angular braces 21 add further support. As will suggest itself, the specific component structure of table 13 may be of any design sufficient to support the weight of container 15 during simulator operation.

Four twist locks 23 are located at each corner of table 13 for securing cargo container 15 to the table. Cargo is placed inside the container and is secured in place by wooden bracing straps, fasteners or other restraining devices (not shown). As will suggest itself, locks 23 may be replaced by any suitable means to retain container 15 onto table 13.

Table 13 is pivotally mounted at each of its sides for swinging action about an axis of oscillation 25. Both sides are constructed from like components and therefore one side will be described in particular. A pillow block bearing 26 is mounted to and directly below the side of table 13 by a vertical structure 30 (FIG. 2) which consists of a pair of I-beams 27, 29 and a cross beam 28. Angular braces (not shown for clarity of the view) between platform table 13 and the vertical structure 30, as well as angular braces between beams 27, 29 add further support. Pillow block bearing 26 is mounted at the center of a shaft 31 which acts as an axis of oscillation for the platform table 13 and the counterweight 41. The shaft 31 is supported at both ends by two pillow block bearings 33 (one is shown) which are mounted on two steel construction stands 35 (one is shown). Stands 35 rest on and are secured to a concrete foundation (not shown).

Pillow block bearing 26 provides a smooth oscillating harmonic motion of table 13 reducing friction which causes excessive stresses in the machine structure. Stands 35 may be formed of an I-beam framework, as shown, sufficient to support the total weight of the loaded simulator 11 and its counterweights.

Two rail guides 37, 39 depend from table 13 at each corner of a side, as shown. The rail guides serve to locate an adjustably positionable counterweight 41 subjacent to table 13. A frame base 45 connects the rail guides at their bottom ends and serves to carry the counterweight.

Figure 2:
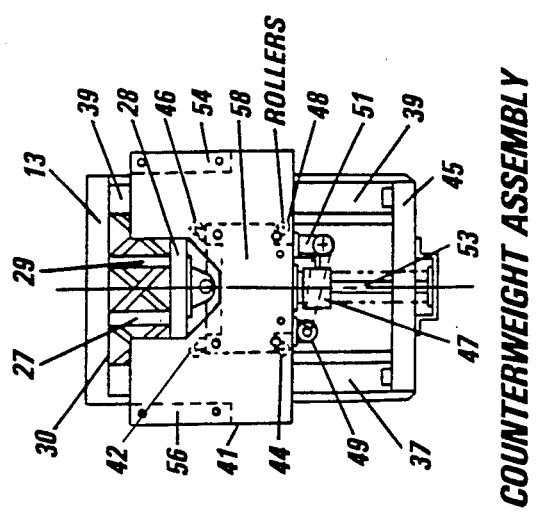
FIG. 2 is a front view of a counterweight assembly of the simulator of FIG. 1.

Referring to FIG. 2, frame base 45 carries a screw jack lift 47 which moves counterweight 41 vertically along guide rails 37, 39. An electric motor 49 together with a belt-driven gear reducer 51 drive a screw jack lift 47 which, in turn, rotates a screw 53 to move the counterweight 41 relative to its frame base 45. Four rollers 42, 44, 46, 48 are mounted to follow rail guides 37, 39 as the counterweight moves relative thereto. Limit switches (not shown) are preferably located at each end of the path of movement of the counterweight 41 for limiting its movement to protect the rail structure from damage.

As shown in FIGS. 1 and 2, counterweight 41 is generally rectangular in shape having a front side container 50 and a back side container 52. The side containers 50, 52 are spaced apart by a pair of small containers 54, 56 and a center container 58 which carries the four rollers 42, 44, 46, 48. Thus, each counterweight 41 may, for example, consist of five containers as shown, filled with a predetermined amount of poured lead. The containers 54, 58, 56 are mounted between the side containers 50, 52 and may be attached together in a manner to facilitate their mounting and dismounting relative to the simulator, upon assembly and repair.

The adjustable counterweights 41, 43 are designed to balance the weight of the particular cargo container 15 being analyzed, by change of the distance of counterweights 41, 43 relative to the axis of oscillation 25.

Referring again to FIG. 1, pivot support assembly 55 is attached to the center and depends from the bottom of table 13. As shown in FIG. 3, a pair of I-beams 57, 59 form the pivot support assembly 55. The two I-beams 57, 59 are interconnected by a bottom member 61 and two brace members 63, 65 disposing the I-beams in a spaced apart relation as shown in FIG. 3. The I-beams 57, 59 are further supported with respect to table 13 by four I-beam braces 67, 69, 71, 73 and four angle braces 75, 77, 79, 81, as shown.

Pivot support assembly 55 has three mounting holes 83, 85, 87 passing through I-beams 57, 59 for receiving a pivot pin aseembly 89. These three holes are located below the axis of oscillation 25 of table 13 and are positioned to obtain different angles of oscillation, as described hereinafter.

A motive assembly 91 serves to oscillate table 13 about its axis of oscillation 25. A connecting rod 93 links motive assembly 91 with pivot support assembly 55. Connecting rod 93 includes a knuckle-joint 92 having an adjustable-centering bearing therethrough for receiving the pivot pin of the pivot pin assembly 89, for providing pivotal rotation of connecting rod 93 relative to I-beams 57, 59. A load cell 95 is mounted on the connecting rod 93 for monitoring the stresses of tension and compression which are generated in the connecting rod 93. Load cell 95 has a predetermined maximum capacity, such as 10,000 pounds, in order to serve as a safety device to protect the simulator from excessive stresses which can be generated in the connecting rod 93 if the counterweights are improperly balanced. Should stresses exceed the maximum capacity, the load cell 95 signals motive assembly 91 to discontinue its powering function. A switch disconnect (not shown) together with the load cell 95 control this automatic stopping of the simulator.

Motive assembly 91 includes a traveling carriage 96 which is slidably reciprocated within a frame structure 97 responsive to rotational movement of a main electric motor 99. Carriage 96 includes an extended arm 98 which is pivotally connected by pin 100 to connecting rod 93.

Motor 99 transmits motion through a chain-sprocket reduction and a speed reducer member 101 to an output shaft 103 serving to rotate a driving arm 105. Preferably, reducer member 101 is a worm gearing type reducer having irreversible motion to prevent the simulator 11 from rocking when the motor is off. This facilitates loading and unloading the machine. Driving arm 105 is pivotably connected to a slider 107 which moves vertically between a pair of rails 109, 110 of the traveling carriage 96. The slider 107 may include rollers engaged with rails 109, 110, as will suggest itself. Also, driving arm 105 has two mounting holes 102, 104 wherein the arm 105 can be attached at the center of slider 107. These two mounting holes provide for the change of the angle of oscillation of table 13, in combination with the positioning of the pivot pin assembly 89 (FIG. 3) in any of the holes 83, 85, 87.

For each rotation of driving arm 105, slider 107 and traveling carriage 96 make one stroke to swing oscillating table 13 in one complete cycle (oscillation). As slider 107 is vertically driven up and down by driving arm 105, traveling carriage 96 travels horizontally along a pair of rails 111, 113 which are mounted on frame structure 97.

Frame structure 97, which rests on and is secured to the concrete foundation (not shown), includes four I-beams 115, 117, 119, 121 vertically mounted with respect to the ground by support braces 123, 125, 127, 129, 131, 133, 135, 137. The top of frame structure 97 is formed by a bracing network of other I-beams 122, 124, 126, 128, 130, 132 as shown, together with support members 134, 136, 138, 140 (140 not shown) angularly bracing the top structure to the vertical beams 115, 117, 119, 121.

Similarly, traveling carriage 96 may be constructed as a frame structure comprising a pair of horizontal I-beams forming the top and bottom of the carriage together with side I-beams which are connected by bracings to the two side rails 109, 110, as shown.

As shown in FIG. 1, main electric motor 99 is positioned on a table structure 139 for centrally locating output shaft 103 with respect to traveling carriage 96. Table structure 139, which also rests on and is secured to the concrete foundation, may be formed from several I-beams and appropriate bracing as will suggest itself.

Electric motor 99 is a variable speed motor so that the simulator may start gradually from a low speed and increase to predetermined simulation speeds, thus protecting the motive assembly 91 against starting shocks. The required maximum oscillation of rolling motion simulated via table 13 is 13 seconds for each oscillating cycle of the table. Additionally, electric motor 99 may have a built-in induced current operated clutch for protecting the motor from overheating. Such a clutch serves as a safety device when a high starting torque driving unit is utilized.

OPERATION OF THE SIMULATOR

Cargo container 15 is mounted and secured atop oscillating table 13. The simulator 11, as described in detail, has a maximum capacity of 50,000 pounds, allowing a safety factor of 5,200 pounds above the maximum weight (44,800 pounds) of cargo container 15. The simulator oscillates in a reverse pendulum harmonic motion to a maximum angle of 45° to each side of the vertical center line of table 13, and a maximum speed of 13 seconds per cycle (4.615 cycles per minute). This motion simulates that of an ocean ship during a severe storm. Other angles of oscillation may be utilized for simulating different wave actions including, for example, 30°, 35° and 40° with respect to the vertical center line. The pivot pin of assembly 89 is located into one of the pin holes 83, 85 or 87 in order to provide a selected angle of oscillation, in combination with one of the two mounting holes 102, 104 of the driving arm 105.

Counterweights 41, 43 are adjusted with respect to the axis of oscillation of table 13 in order to balance the weight of container 15. The simulator is started slowly at first in order to enable the operator to adjust the counterweights according to stresses in connecting rod 93. A force gauge (not shown) is connected to load cell 95 for visually indicating to the operator the stresses (compression and tension) in connecting rod 93 during the simulator's operation. The operator via controls (not shown) may actuate motor 49 (FIG. 2) in order to position the counterweights. The simulator speed may be increased to 13 seconds per cycle by the operator as he monitors the output reading of the force gauge in conjunction with his controlling of the position of the counterweights.

As understood, sensing devices (not shown) are attached to the wooden restraint system (not shown) within cargo container 15 in order to generate test data for analyzing the specific restraint system being tested.

Figure 4:
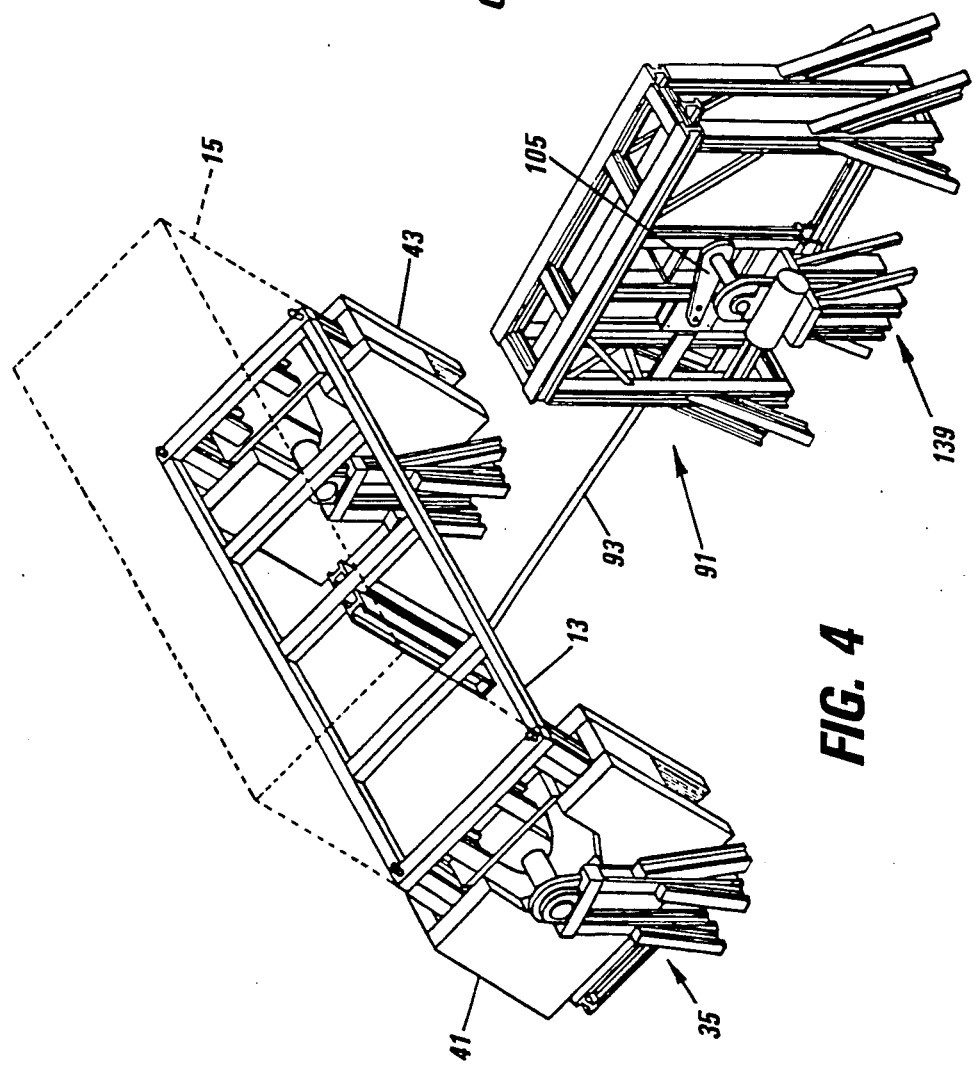
FIG. 4 is a perspective view of the simulator of FIG. 1 wherein the cargo is tilted at a 45° angle.

FIG. 4 illustrates the shipboard transportation simulator of FIG. 1 with oscillating table 13 rotated clockwise 45° from the vertical center line. This occurs when driving arm 105 is rotated 90°, as shown, pushing connecting rod 93 to the left causing the oscillating table and cargo container to rotate about the axis of oscillation 25 represented by shafts 31. Continued 90° movement of driving arm 105 will return table 13 to the vertical center line. Thereafter, movement of driving arm 105 another 90° tilts the table 45° anti-clockwise. Further movement of driving arm 105 for the last 90° of one rotation will complete one cycle returning the table to the vertical center line.

THE BREAKBULK TABLE

Figure 5:
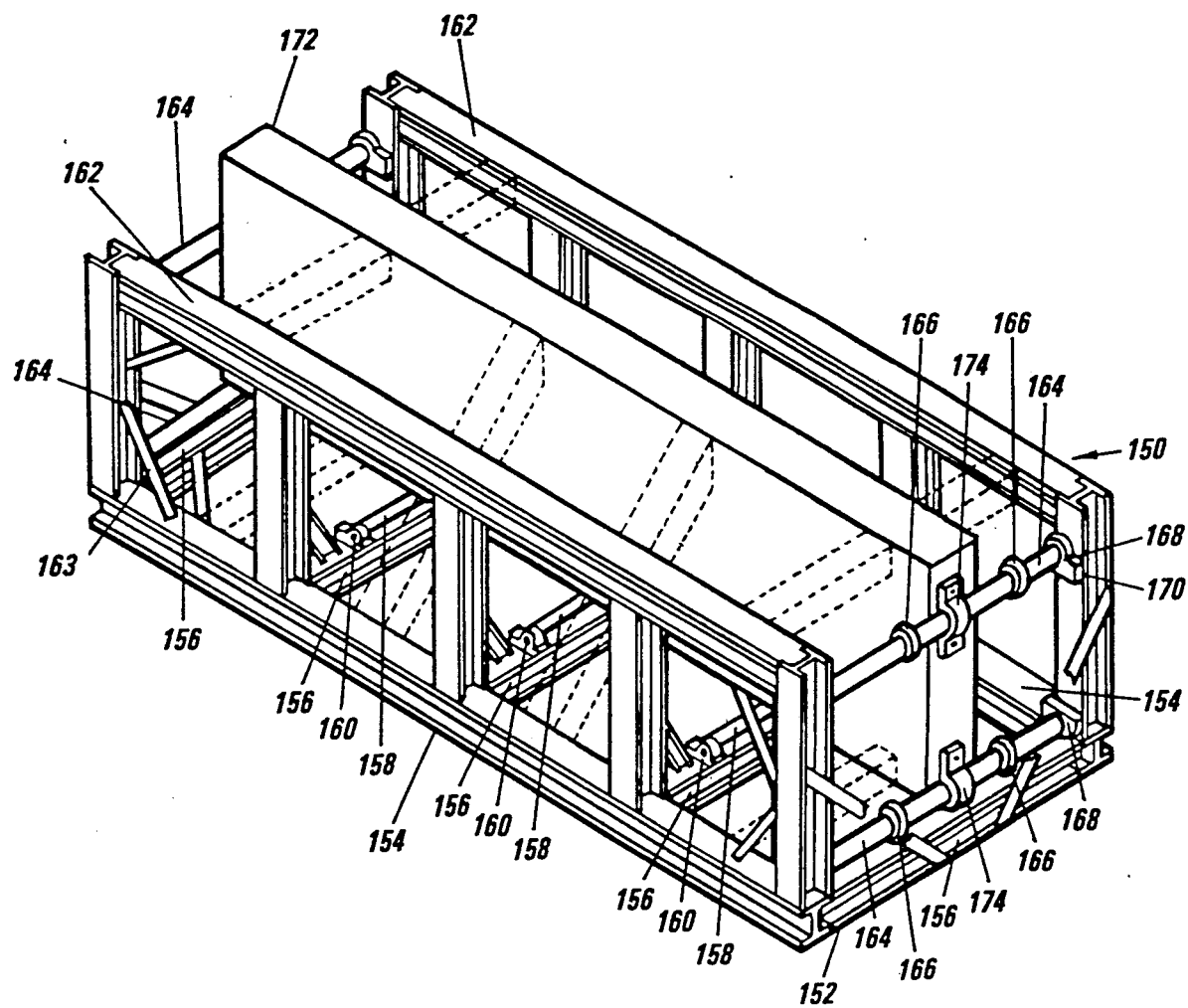
FIG. 5 is a perspective view of a preferred breakbulk cargo dynamic table, which is an attachment to the preferred simulator of the invention.

Referring to FIG. 5, the breakbulk cargo dynamic testing table 150 is a supplementary attachment for the simulator 11, to test restraint systems for cargo packaged in smaller containers. A frame of the breakbulk table 150 has a steel structural platform 152, which includes two spaced, longitudinal I-beams 154 and five cross I-beams 156. Each of the interior cross beams 156 carries a shaft 158 on two transversely spaced bearing blocks 160. Two steel structural walls 162 are welded one on each side of the platform 152. Corner stiffeners 163 are welded to both walls 162 and the platform 152 to support them. Two end shafts 164 are mounted at each end of the table 150. Each shaft 164 carries two transversely spaced limit collars 166 and is supported at both ends on two bearing blocks 168 which are mounted to the walls 162 on supports 170. A sliding steel plate 172 carries four bearings 174, two on each end, and three supporting bearings (not shown) on the bottom. The bearings 174 are mounted on the end shafts 164, one per shaft, between the limit collars 166. The supporting bearings (not shown) are likewise mounted on the shafts 158, between the blocks 160. The table 150 includes means at its four corners for locking onto the simulator 11.

OPERATION OF THE SIMULATOR WITH THE BREAKBULK TABLE

The sliding plate 172, which may weigh 20,000 pounds, simulates breakbulk cargo. The plate 172 is braced by a restraint system, such as the wooden bracing shown in phantom, to the breakbulk table frame on both sides of the plate 172. A clearance is allowed between the plate 172 and bracing. The table 150 is placed and locked on the simulator 11, in the place of a cargo container 15. When the simulator 11 oscillates, the plate 172 slides within the allowed clearance, and strikes the restraint system, to test its strength. If the restraint system should fail, the limit collars 166 limit movement of the plate 172 to prevent damage to the frame of the table 150.

The preferred embodiment, and the manner and process of making and using the invention are now described in such full, clear, concise and exact terms as to enable a person of ordinary skill in the art to make and use the same.

It is to be understood, of course, that modifications and supplementary attachments may be made to the preferred embodiment. Therefore, to particularly point out and distinctly claim the subject matter regarded as invention, the following claims conclude this specification.

What is claimed is:

1. A shipboard transportation simulator for moving a cargo container in a wave-like simulation, said cargo container having a cargo center of gravity, said simulator comprising:
   a simulator frame;
   means for supporting said frame for movement about a real axis;
   means for driving said frame in movement about said axis;
   means on said frame for supporting said cargo container with said cargo center of gravity above said axis;
   said cargo and frame having a combined center of gravity; and
   means on said frame for balancing the moment about said axis of the cargo center of gravity for locating said combined center of gravity substantially at said axis;
   whereby said cargo container may be tested upon said simulator by reverse pendulum harmonic motion.

2. A shipboard transportation simulator as in claim 1 in which the frame supporting means includes an axle defining said axis and in which the frame is adapted for oscillation about the axle.

3. A shipboard transportation simulator as in claim 1 in which the balancing means includes counterweight means and further comprising means for operator positioning of said counterweight means relative to said axis;
   whereby cargo containers of varying weights and cargos may be tested upon the simulator.

4. A shipboard transportation simulator as in claim 3 in which said operator positioning means adjusts the distance of said counterweight means below said axis.

5. A shipboard transportation simulator as in claim 1 in which the frame supporting means includes supporting bases for said frame.

6. A shipboard transportation simulator as in claim 2 in which the driving means includes means for varying the angle of oscillation and the frequency of oscillation of the frame and supported cargo container.

7. A shipboard transportation simulator as in claim 1 in which said driving means includes a motive assembly comprised of a motive frame having longitudinal rails thereon, a travelling carriage mounted for reciprocating movement on said rails, a pair of spaced vertical guide rails on said travelling carriage, a variable speed shaft drive having a variable speed output shaft, a driving arm on said shaft terminating in a plate positioned between said spaced vertical guide rails, said plate slidably mounted with respect to said guide rails, whereupon said drive causes said travelling carriage to reciprocate along said longitudinal rails.

8. A shipboard transportation simulator as in claim 7 in which said driving arm and plate are adapted for adjustable mounting to each other for providing said different angles of oscillation.

9. A shipboard transportation simulator as in claim 7 in which said simulator frame includes a platform table and a pivot support assembly depending from said platform table, said driving means further including means for interconnecting said travelling carriage with said pivot support assembly to impart oscillating motion to said frame, and pressure sensing means for stopping said oscillating motion when the force on said interconnecting means exceeds a predetermined value.

10. A shipboard transportation simulator as in claim 9 in which said pivot support assembly and interconnecting means are adapted for adjustable mounting to each other below said axis for providing said different angles of oscillation.

11. A breakbulk table for a shipboard transportation simulator comprising:
a frame including a platform and walls;
a plate simulating breakbulk cargo; and
means on the plate and frame for providing sliding movement of the plate relative to the frame;
whereby a breakbulk restraint system may be placed between the plate and the platform and walls of the frame, and the breakbulk table oscillated on the simulator to test the restraint system.

12. A breakbulk table as in claim 11 further comprising means for limiting the sliding movement of the plate to protect the frame.

13. A shipboard transportation simulator comprising:
a cargo container,
a carriage frame for supporting said cargo container,
said frame being adapted to rock about a stationary axis of rotation,
means for rocking said frame about said stationary axis of rotation,
said container and frame having a center of gravity above said axis of rotation, and
weight means on said frame for establishing a new center of gravity of said weight means, container and frame at said axis of rotation.

* * * * *